United States Patent [19]
Scarano

[11] Patent Number: 5,662,270
[45] Date of Patent: Sep. 2, 1997

[54] CONTAMINANT RESISTANT STRAIGHT LINE MOTION SHOWER PIPE ASSEMBLY

[76] Inventor: Robert V. Scarano, 18 Queens Way, Queensbury, N.Y. 12804

[21] Appl. No.: 267,957

[22] Filed: Jun. 29, 1994

[51] Int. Cl.$^6$ .................................. B05B 3/18; F16H 21/44
[52] U.S. Cl. ........................ 239/264; 239/225.1; 74/103
[58] Field of Search ........................... 239/264, 225.1; 162/277, 275, 272, 199; 134/172, 122 R; 68/205 R; 74/103, 490.03, 490.05

[56] References Cited

U.S. PATENT DOCUMENTS

| | | | |
|---|---|---|---|
| 497,763 | 5/1893 | Campbell | 239/264 |
| 1,381,272 | 6/1921 | Bird | 162/277 |
| 1,516,593 | 11/1924 | Eyrich | 68/205 R |
| 2,151,357 | 3/1939 | Reitzel | 162/277 |
| 2,319,088 | 5/1943 | Roethel | 74/103 |
| 4,299,533 | 11/1981 | Ohnaka | 74/103 |
| 4,605,472 | 8/1986 | Nakamura | 162/277 |
| 4,661,253 | 4/1987 | Williams | 239/264 |
| 4,753,712 | 6/1988 | Martin et al. | 68/205 R |
| 5,410,767 | 5/1995 | Barud | 74/103 |

*Primary Examiner*—Lesley D. Morris
*Attorney, Agent, or Firm*—Heslin & Rothenberg, P.C.

[57] ABSTRACT

A straight line motion producing apparatus useable in the papermaking process includes a base, a first arm rotatable about a first axis being stationary relative to the base during rotation of the first arm. A second arm is rotatable about a second axis extending through the first arm such that the distance between the first axis and second axis remains constant. The second arm should be of a length relative to the distance between the first and second axis to produce a straight line motion at a particular location of the second arm upon rotation of the second arm about the second axis a constant distance per degree of rotation of the first arm about the first axis. The apparatus further includes a mechanism for rotating the second arm about the second axis a constant distance per degree of rotation of the first arm about the first axis to produce a straight line motion at a particular location on the second arm.

42 Claims, 6 Drawing Sheets

CONTAMINANT RESISTANT STRAIGHT LINE MOTION SHOWER PIPE ASSEMBLY

BACKGROUND OF THE INVENTION

The invention is directed to a straight line motion shower pipe assembly useable in the papermaking process to condition or clean fabrics while minimizing the accumulation of unwanted deposits on the assembly.

In the papermaking industry, highly developed fabrics are processed. During the processing of these fabrics, it is preferred that the fabrics be maintained in a clean condition. However, increased use of recycled fiber has resulted in high levels of contamination of incoming furnish which has in turn resulted in an accelerated rate of fabric plugging. Also, dirty mill water is often used in the papermaking process. The use of such dirty mill water has necessitated more effective showering.

Shower pipe assemblies have been used to facilitate effective showering in the papermaking process. Shower pipe assemblies include a pipe which spans the length of a fabric run and contains a plurality of nozzles extending therefrom. Cleaning fluid of high pressure is run through the pipe and discharged through the nozzles which are typically oriented normal to the surface of the fabric. The shower pipe is oscillated along its axis to allow the shower of fluid to cover the entire fabric which is conveyed in a tangential direction relative to the circumference of the shower pipe. The oscillation also prevents the high pressure fluid which is discharged from the nozzles from contacting an area on the fabric for a period of time which will damage the fabric. Typically, the shower pipe is supported in a plurality of sleeve bearings where the shower pipe oscillates in a direction parallel to the axis of the sleeve bearing. A hydraulic, pneumatic or electric actuator is connected to the shower pipe to control the oscillation thereof.

During the papermaking process, contaminants tend to accumulate within the sleeve bearing between the sleeve and pipe thereby creating increased friction therebetween. In order to maintain the appropriate rate of oscillation of the shower pipe and thereby prevent damaging of the fabric being processed, the force transmitted by the actuator must be increased. Such an increase in the force applied by the actuator results in poor reliability and reduced oscillator life.

It is therefore desirable to provide a system for producing straight line motion which may be used in the papermaking process.

It is also desirable to provide a system for producing straight line motion which is capable of supporting the shower pipe assembly while reducing the effects of the accumulation of debris thereupon thereby minimizing frictional force.

SUMMARY OF THE INVENTION

The aforementioned goals may be achieved by using a straight line motion producing apparatus constructed in accordance with the principles of the present invention. The apparatus includes a base, a first arm rotatable about a first axis being stationary relative to the base during rotation of the first arm; a second arm rotatable about a second axis extending through the first arm wherein the distance between the first axis and second axis remains constant; the second arm being of a length relative to the distance between the first and second axis to produce a straight line motion at a particular location of the second arm upon rotation of the second arm about the second axis a constant distance per degree of rotation of the first arm about the first axis; and means for rotating the second arm about the second axis a constant distance per degree of rotation of the first arm about the first axis to produce a straight line motion at the particular location on the second arm.

The apparatus may further include a seal located between the first arm and the base and/or a seal located between the second arm and the first arm. The apparatus may also include a bearing mounted to allow the first arm to rotate about the first axis and/or a bearing mounted to allow the second arm to rotate about the second axis. The apparatus may also include a means for pivotably securing a fabric conditioning shower pipe to the particular location on the second arm or straight line motion is produced. The fabric conditioning shower pipe may be removably secured to the pivotable securing means. The pivotable securing means may include a clamp.

The means for rotating may include a first pulley having its central axis being coaxial with the first axis, the first pulley being incapable of rotating relative to the first axis; the second pulley having its central axis being coaxial with the second axis; and a belt engaged to the first pulley and the second pulley to prevent slippage between the belt and the first pulley and to prevent slippage between the belt and the second pulley.

The first arm may comprise a housing enclosing the first pulley, belt, and second pulley. The first pulley, belt, second pulley, and bearings may be sealed to minimize contaminant accumulation thereupon. The belt may be affixed to the second pulley by a fastener.

The means for rotating may include a first sprocket having its central axis being coaxially with the first axis, the first sprocket being incapable of rotating relative to the first axis, a second sprocket may have its central axis being coaxial with the second axis, and a chain engaged to the first sprocket and the second sprocket.

The means for rotating may also include a first gear having its central axis coaxial with the first axis, the first gear being incapable of rotating to the first axis; an outer planetary gear having its central axis being coaxial with the second axis, and an intermediate planetary gear being engaged with the first gear and with the second outer planetary gear.

One or more of the straight line producing apparatuses may be used to support a shower pipe assembly useable in the papermaking process.

BRIEF DESCRIPTION OF THE DRAWINGS

The invention may best be described in the following detailed description when read in conjunction with the accompanying drawings in which.

DETAILED DESCRIPTION

Figure 1:
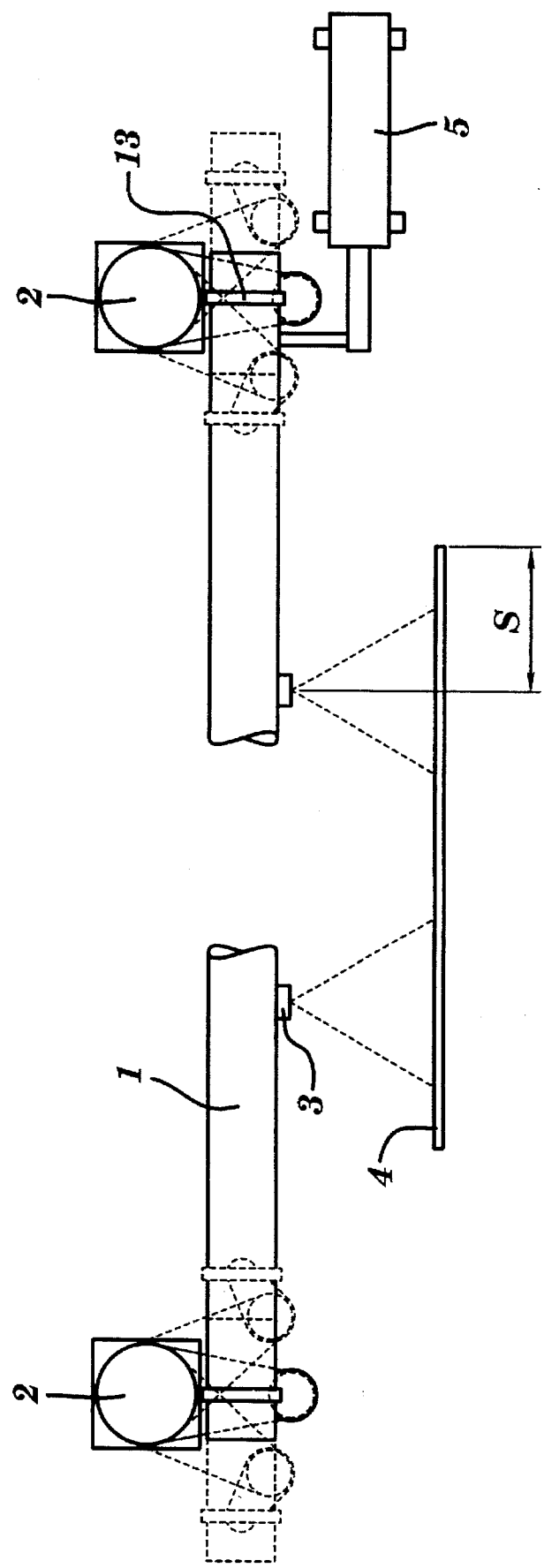
FIG. 1 depicts a schematic representation of a shower pipe assembly using two straight line motion producing devices constructed in accordance with the principles of the present invention.

Referring to FIG. 1, a straight line motion shower pipe assembly is shown. The assembly includes a shower pipe 1 having one or more nozzles 3 radially protruding therefrom and pointing in a direction normal to a fabric surface 4 of a belt of fabric being conveyed in a direction tangential to the circumference of the shower pipe 1. One or more straight line motion producing apparatuses 2 support the shower pipe 1 allowing the shower pipe 1 to be oscillated along a stroke length S in a straight line. An actuator 5 may be operatively engaged to the shower pipe 1 and/or straight line motion producing apparatus 2 to create the oscillating straight line motion. As shown in FIG. 1, the actuator 5 may be directly connected to the shower pipe 1. However, the actuator could also be connected to the straight line motion producing apparatus including any linkage thereof.

Figure 2A:
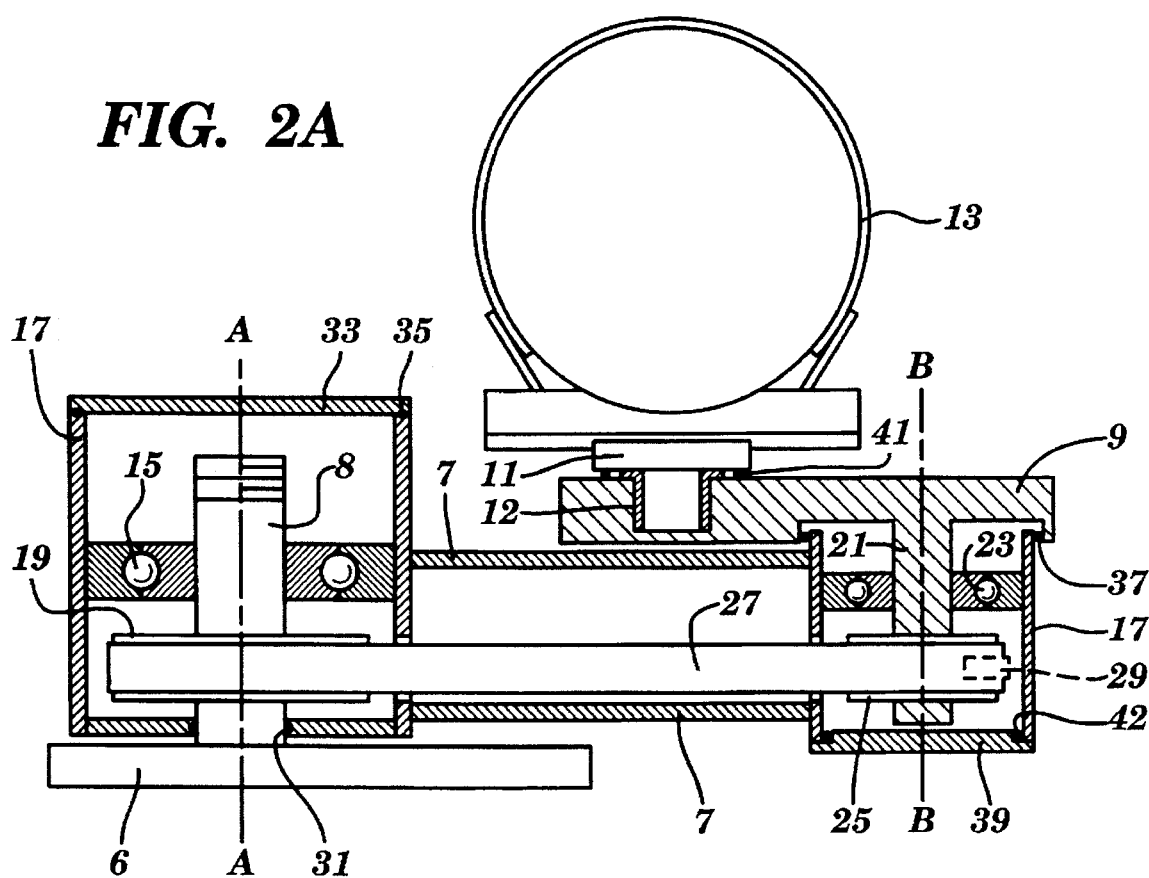
FIG. 2A depicts a sectional view from the side of a straight line motion producing apparatus useable in conjunction with a shower pipe assembly and constructed in accordance with the principles of the present invention.
Figure 2B:
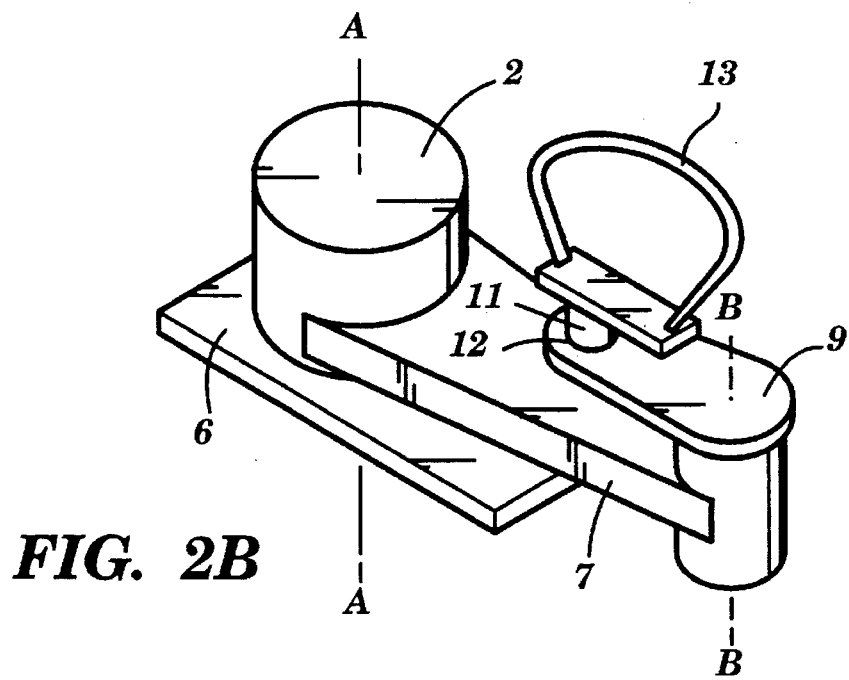
FIG. 2B depicts an isometric view of the straight line motion producing apparatus depicted in FIG. 2A.

Referring to FIG. 2B, one embodiment of the straight line motion producing apparatus 2 is shown. The apparatus includes a base 6 and a first arm 7 which is rotatable about a first axis A—A which remains stationary relative to the base 6. A second arm 9 is pivotably secured to the first arm and is rotatable about a second axis B—B which extends through the first arm 7 at the end thereof opposite axis A—A. During oscillation of the apparatus, the distance between axis A—A and axis B—B remains constant. The second arm 9 contains a pivotable connection means 11 operatively engaged to a means for supporting the shower pipe. Such a means, as depicted in FIG. 2B, may include a clamp assembly 13 inserted within an aperture 12 in the second arm 9.

The apparatus also includes a means for rotating the second arm 9 about the axis B—B a constant distance per a degree of rotation of the first arm about axis A—A to produce a straight line motion at a particular location on a second arm, i.e., the point where the pivotable connection means 11 is located. However, the second arm must be of a length relative to the distance between axis A—A and axis B—B to produce a straight line motion at the pivotable connection means 11 upon rotation of the first arm 7 and/or second arm 9. Moreover, rotation must occur at a constant distance, i.e., angle, per degree of rotation of the first arm. The distance between the pivotable connection means 11 and axis B—B should be 0.3 times the distance between axis A—A and axis B—B. Moreover, the second arm must rotate about axis B—B 1.86 degrees for every one degree of rotation of the first arm 7 about axis A—A.

Figure 4:
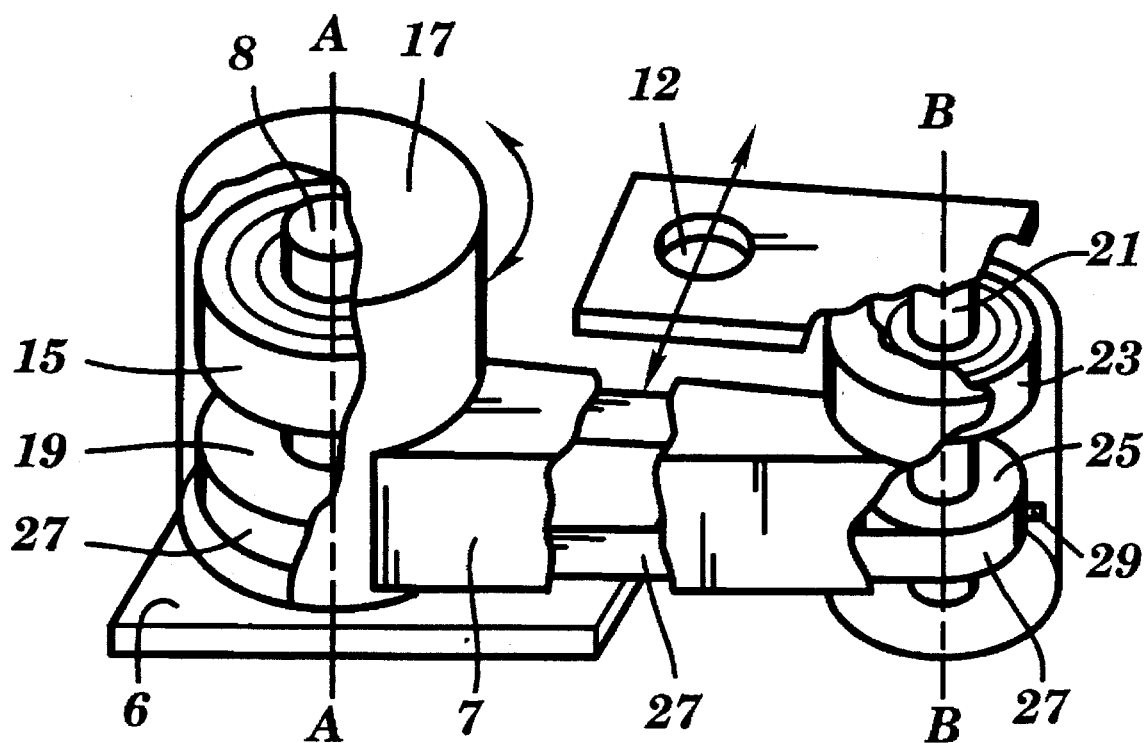
FIG. 4 depicts an isometric schematic sectional view of a portion of the straight line motion producing apparatus constructed in accordance with the principles of the present invention.

Referring to FIG. 2A and FIG. 4, the details of one embodiment of the straight line motion producing apparatus will be described. A first bearing 15 may be mounted between a housing 17 which defines the first arm 7. As shown in FIG. 2A, the housing 17 may cover a stud 8 of the base 6. First bearing 15, being mounted between the stud 8 of the base and housing 17, allows the first arm to rotate about axis A—A. A first pulley 19 may be rigidly affixed to allow its central axis to be coaxial with axis A—A and to prevent rotation about axis A—A. At the opposite end of the first arm 7 the second arm 9 is positioned to rotate about axis B—B. A stud 21 protruding from the second arm 9 may be positioned within the housing 17 by a second bearing 23 to allow rotation of the second arm relative to the first arm about axis B—B. A second pulley 25 is rigidly affixed to the second arm, preferably by affixation to stud 21, so as to be incapable of rotating relative to second arm 9. A belt 27 may be located around first pulley 19 and second pulley 25. Belt 27 may extend through the housing 17 defining the first arm. The belt 27 is affixed to the second pulley 25 in such a manner to prevent slippage therebetween. For example, a fastener 29 such as a pin, bolt, or the like may be used to secure the belt to the second pulley 25, if necessary or desired. The housing 17 should cover the means for rotating the second arm, including the first pulley 19 and the second pulley 25.

As further shown in FIG. 2A, the relative lengths of first arm 7 and second arm 9 are optimally chosen to allow clearance between attached shower pipe 13 and any protruding structure in the vicinity of axis A—A throughout its potential range of straight line motion. In the specific embodiment illustrated in FIG. 2A, which employs a generally circular housing extending about axis A—A, this relationship can be expressed as requiring that the length of second arm 9 (the distance between the pivotal connector 11 and axis B—B) plus the radius at the pivotal connector of shower pipe 13 must be less than the length of first arm 7 (the distance between axis A—A and axis B—B) less the radius of housing 17.

A pivotable connection means 11 may include an aperture 12 located at the point of the second arm 9 where straight line motion is achieved. Attached to the pivotable connection means 11 may be a means for supporting a shower pipe assembly such as a clamp 13 which is preferably adjustable and arcuate in shape to secure the shower pipe therein (FIG. 1). The clamp 13 rotates relative to the second arm 9 about a point where straight line motion is desired.

The distance between axis A—A and axis B—B relative to the length of the second arm 9 between the point where straight line motion is desired and axis B—B must be such to produce straight line motion at the desired location. Also, the second arm must rotate a particular angular distance, i.e., degree, about axis B—B relative to the first arm per each degree of angular rotation of the first arm about axis A—A. Having the distance of the second arm, between axis B—B and the point where straight line motion is desired, being 0.3 times the length of the first arm, between axis A—A and axis B—B, and having the size of the pulleys being such to produce 1.86° of rotation of the second arm 9 about axis B—B per 1° of rotation of the first arm about axis A—A, will produce a straight line motion at pivotable connection means 11 (i.e., the point where straight line motion is desired).

Figure 3:
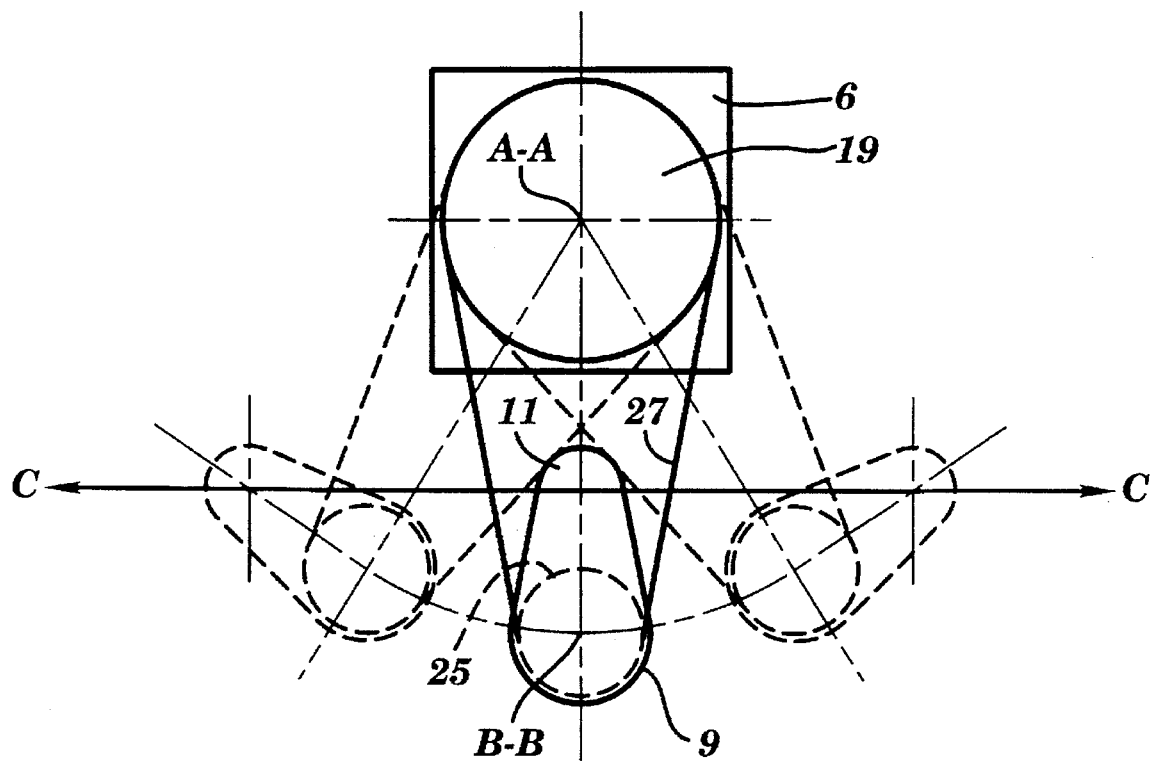
FIG. 3 depicts a schematic representation of the straight line motion producing apparatus depicted in FIG. 2 located in various positions to produce a straight line motion.

Referring to FIG. 3, operation of the apparatus to produce a straight line motion will now be described. The belt 27 should be secured to first pulley 19 and second pulley 25 in such a manner to avoid slippage between the pulleys and the belt 27. Preferably, a steel belt is used. However, belts made of other materials may be used with the apparatus in accordance with the invention to produce straight line motion in a shower pipe assembly. First, pulley 19 is rigidly affixed to base 6 to prevent rotation about axis A—A. Also, second pulley 25 is rigidly affixed to second arm 9 about axis B—B to prevent rotation relative thereto. As the second pulley 25 and the first arm 7 are rotated about axis A—A, pivotable connection means 11 will remain on line C—C so long as the pulleys are sized to produce 1.86° of rotation of the second arm 9 per 1° of rotation of the first arm about axis A—A. By using an actuator operatively engaged to either a shower pipe or the straight line motion producing apparatus to facilitate oscillation, straight line oscillation about line C—C may be produced. The apparatus may be used in the paper processing industry to produce straight line oscillation and motion of a shower pipe 1, as depicted in FIG. 1.

Referring to FIG. 2A, proper sealing of the housing 17 may assist in preventing the accumulation of debris within the first and second bearings 15, 23 to prevent frictional energy losses. A seal 31 is preferably located between the housing 17 and base 6 to prevent leakage of debris therebetween. Also, housing 17 may have a first cover 33 being removable therefrom. However, an additional seal 35 should be located between housing 17 and the first cover 33. To prevent the accumulation of debris in the second bearing 23, a seal 37 may be located between the housing 17 and the second arm 9 to prevent the passage of debris therebetween. Also, the housing 17 may also have a second cover 39 removable therefrom to provide access to the second pulley 25 and second bearing 23. However, a seal 42 is preferably located between the second cover 39 and housing 17 to prevent leakage of debris therebetween. Additionally, a seal 41 may be located between pivotable connection means 11 and second arm 9 to prevent collection of debris therebetween. Also, pivotable connection means 11 may be coated with a material on the surface which facilitates rotation relative to the second arm 9. For example, teflon or nylon, or other similar materials may be used.

In addition to the pulley and belt assembly depicted in FIGS. 2A and 4, other means may be used to rotate the second arm 1.86 degrees about axis B—B relative to the angular rotation of the first arm per each degree about axis A—A. For example, referring to FIG. 5, a sprocket and chain combination may be used to provide the proper rotation. The sprocket and chain combination, as the means for producing the proper relative rotation, may be readily incorporated into the straight line motion producing apparatus depicted in FIGS. 2A and 2B by substituting sprockets for the first and second pulleys, and a chain for the belt.

Figure 5:
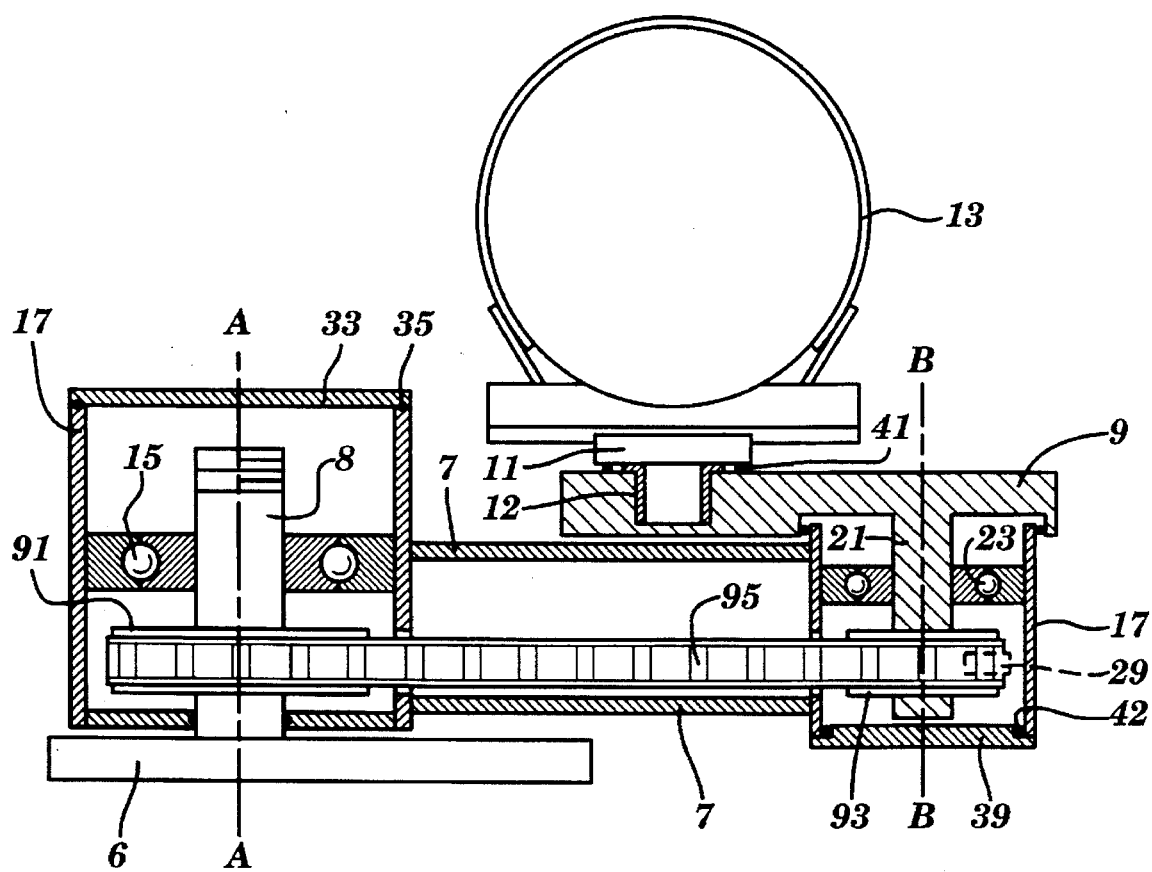
FIG. 5 depicts a schematic representation of an alternative embodiment of the straight line motion producing apparatus constructed in accordance with the principles of the present invention.

Referring to FIG. 5, such an alternative configuration is shown. A first sprocket 91 may be affixed relative to base 6 while a second sprocket 93 may also be affixed to the second arm 9. A chain 95 is mounted around the first sprocket 91 and second sprocket 93 which are sized to provide the proper 1.86° of rotation of the second sprocket about axis B—B relative to each degree of rotation of the first arm 7 about axis A—A.

Figure 6:
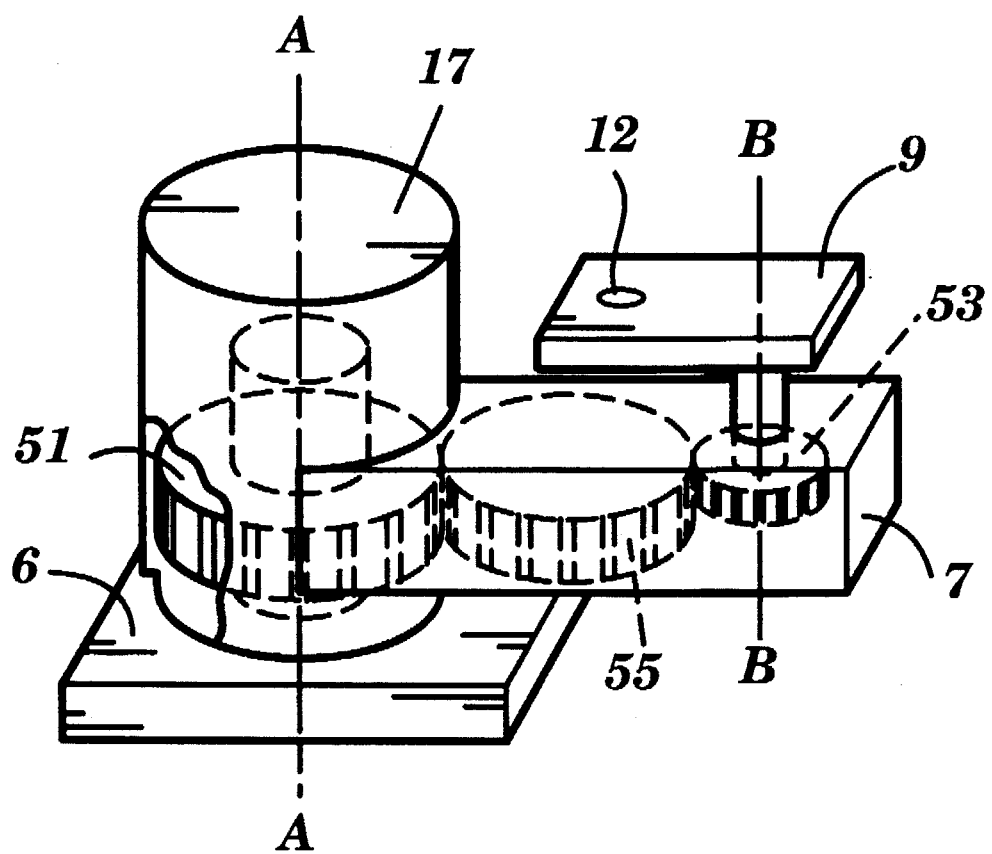
FIG. 6 depicts a schematic representation of yet another embodiment of the straight line motion producing apparatus constructed in accordance with the principles of the present invention.

FIG. 6 depicts yet another embodiment of the straight line producing apparatus using another alternative means for providing the proper rotation between first arm 7 and second arm 9. In this configuration, a gear train is used. Here, a first gear 51 is rigidly affixed to base 1 and axis A—A so that there is no relative motion therebetween. An outer planetary gear 53 having its central axis being coaxial with the second axis B—B is rigidly affixed to the second arm 9 so that there is no relative rotation therebetween. An intermediate planetary gear 55 may be located between the first gear 51 and the outer planetary gear 53. The planetary gears must be sized to produce the relative 1.86° of rotation of the second arm about axis B—B per each degree of rotation of the first arm about axis A—A. Using such a configuration, rotation of either of the planetary gears will produce a straight line motion about pivotable connection means 11, i.e., the point where straight line motion is desired.

Although the invention has been disclosed in connection with the embodiments depicted herein, it will be apparent to one of ordinary skill in the art that various modifications and substitutions may be made to these embodiments without departing in any way from the scope of the invention as defined in the following claims.

What is claimed is:

1. A straight line motion producing apparatus comprising:
    a base;
    a first arm rotatable about a first axis, said first axis being stationary relative to said base during rotation of said first arm;
    a second arm rotatable about a second axis extending through said first arm wherein the distance between the first axis and second axis remains constant;
    said second arm being of a length relative to the distance between the first and second axis to produce a straight line motion at a particular location of said second arm upon rotation of said second arm about said second axis a constant distance per degree of rotation of said first arm about said first axis; and
    means for rotating the second arm about said second axis a constant distance per degree of rotation of said first arm about said first axis to produce a straight line motion at said particular location on said second arm;
    wherein said means for rotating comprises:
    a first pulley having its central axis being coaxial with said first axis, said first pulley being incapable of rotating relative to said first axis;
    a second pulley having its central axis being coaxial with said second axis; and
    a belt engaged to the first pulley and the second pulley to prevent slippage between the belt and the first pulley, and to prevent slippage between the belt and the second pulley.

2. The apparatus of claim 1 further comprising a seal located between said first arm and said base.

3. The apparatus of claim 2 further comprising a seal located between said second arm and said first arm.

4. The apparatus of claim 3 further comprising a bearing mounted to allow the first arm to rotate about the first axis.

5. The apparatus of claim 4 further comprising a bearing mounted to allow the second arm to rotate about the second axis.

6. The apparatus of claim 5 further comprising a means for pivotally securing a fabric conditioning shower pipe to the particular location on said second arm where straight line motion is produced.

7. The apparatus of claim 6 wherein said pivotal securing means comprises a clamp.

8. The apparatus of claim 6 wherein a fabric conditioning shower pipe is removably secured to said pivotal securing means.

9. The apparatus of claim 1 wherein said first arm comprises a housing enclosing said first pulley, belt and second pulley.

10. The apparatus of claim 9 wherein said first pulley, belt, second pulley, and bearings are sealed to minimize contaminant accumulation thereupon.

11. The apparatus of claim 10 wherein said belt is affixed to the second pulley by a fastener.

12. A contaminant resistant straight line motion shower pipe assembly apparatus comprising:
    a base;
    a first arm rotatable about a first axis, said first axis being stationary relative to said base during rotation of said first arm;

a second arm rotatable about a second axis extending through said first arm wherein the distance between the first axis and second axis remains constant;

said second arm being of a length relative to the distance between the first and second axis to produce a straight line motion at a pivotal connector affixed to said second arm upon rotation of said second arm about said second axis a constant distance per degree of rotation of said first arm about said first axis;

means for rotating the second arm about said second axis a constant distance per degree of rotation of said first arm about said first axis to produce a straight line motion at said particular location on said second arm;

a shower pipe pivotally supported by said second arm by means of said pivotal connector such that said straight line motion is produced along an axis of said shower pipe; and the distance between said pivotal connector and said second axis being less than the distance between said first axis and said second axis.

13. The apparatus of claim 12 further comprising a seal located between said first arm and said base.

14. The apparatus of claim 13 further comprising a seal located between said second arm and said first arm.

15. The apparatus of claim 14 further comprising a bearing mounted to allow the first arm to rotate about the first axis.

16. The apparatus of claim 15 further comprising a bearing mounted to allow the second arm to rotate about the second axis.

17. The apparatus of claim 15 wherein said pivotable connector comprises a clamp.

18. The apparatus of claim 12 wherein said means for rotating comprises:

a first pulley having its central axis being coaxial with said first axis, said first pulley being incapable of rotating relative to said first axis;

a second pulley having its central axis being coaxial with said second axis; and a belt engaged to the first pulley and the second pulley to prevent slippage between the belt and the first pulley, and to prevent slippage between the belt and the second pulley.

19. The apparatus of claim 18 wherein said first arm comprises a housing enclosing said first pulley, belt, and second pulley.

20. The apparatus of claim 19 wherein said first pulley, belt, second pulley, and bearings are sealed to minimize contaminant accumulation thereupon.

21. The apparatus of claim 20 wherein said belt is affixed to the second pulley by a fastener.

22. The apparatus of claim 18, wherein said distance between said pivotal connector and said second axis plus a radius of said shower pipe is less than said distance between said first axis and said second axis less a radius of said housing about said first pulley.

23. The apparatus of claim 22, wherein said distance between said pivotal connector and said second axis is less than or equal to three tenths of said distance between said first axis and said second axis.

24. The apparatus of claim 12 wherein said means for rotating comprises a first sprocket having its central axis being coaxial with said first axis, said first sprocket being incapable of rotating relative to said first axis;

a second sprocket having its central axis being coaxial with said second axis; and a chain engaged to said first sprocket and said second sprocket.

25. The apparatus of claim 24, wherein said distance between said pivotal connector and said second axis plus a radius of said shower pipe is less than said distance between said first axis and said second axis less a radius of said housing about said first sprocket.

26. The apparatus of claim 25, wherein said distance between said pivotal connector and said second axis is less than or equal to three tenths of said distance between said first axis and said second axis.

27. The apparatus of claim 12 wherein said means for rotating comprises a first gear having its central axis coaxial with said first axis, said first gear being incapable of rotating relative to said first axis;

an outer planetary gear having its central axis being coaxial with said second axis; and an intermediate planetary gear being engaged with said first gear and with said outer planetary gear.

28. The apparatus of claim 27, wherein said distance between said pivotal connector and said second axis plus a radius of said shower pipe is less than said distance between said first axis and said second axis less a radius of said housing about said first gear.

29. The apparatus of claim 28, wherein said distance between said pivotal connector and said second axis is less than or equal to three tenths of said distance between said first axis and said second axis.

30. The apparatus of claim 12 wherein said shower pipe is removably attached to a second straight line motion shower pipe assembly apparatus.

31. A straight line motion producing apparatus comprising:

a base;

a first arm rotatable about a first axis, said first axis being stationary relative to said base during rotation of said first arm;

a second arm rotatable about a second axis extending through said first arm wherein the distance between the first axis and second axis remains constant;

said second arm being of a length relative to the distance between the first and second axis to produce a straight line motion at a particular location of said second arm upon rotation of said second arm about said second axis a constant distance per degree of rotation of said first arm about said first axis; and means for rotating the second arm about said second axis a constant distance per degree of rotation of said first arm about said first axis to produce a straight line motion at said particular location on said second arm;

the distance between said particular location and said second axis being less than the distance between said first axis and said second axis.

32. The apparatus of claim 31 wherein said means for rotating comprises a first sprocket having its central axis being coaxial with said first axis, said first sprocket being incapable of rotating relative to said first axis;

a second sprocket having its central axis being coaxial with said second axis; and a chain engaged to said first sprocket and said second sprocket.

33. The apparatus of claim 31 wherein said means for rotating comprises a first gear having its central axis coaxial with said first axis, said first gear being incapable of rotating relative to said first axis;

an outer planetary gear having its central axis being coaxial with said second axis; and an intermediate planetary gear being engaged with said first gear and with said outer planetary gear.

34. The apparatus of claim 31 further comprising a seal located between said first arm and said base.

35. The apparatus of claim 34 further comprising a seal located between said second arm and said first arm.

36. The apparatus of claim 35 further comprising a bearing mounted to allow the first arm to rotate about the first axis.

37. The apparatus of claim 36 further comprising a bearing mounted to allow the second arm to rotate about the second axis.

38. The apparatus of claim 31, wherein said first axis, said second axis, and said means for rotating said second axis are sealed to minimize contaminant accumulation thereupon.

39. The apparatus of claim 31, where said means for rotating comprises a first pulley having its central axis being coaxial with said first axis, said first pulley being incapable of rotating relative to said first axis;

a second pulley having its central axis being coaxial with said second axis; and a belt engaged to the first pulley and the second pulley to prevent slippage between the belt and the first pulley, and to prevent slippage between the belt and the second pulley.

40. The apparatus of claim 31, wherein said means for rotating comprises a first sprocket having its central axis being coaxial with said first axis, said first axis being coaxial with said first axis, said first sprocket being incapable of rotating relative to said first axis;

a second sprocket having its central axis being coaxial with said second axis; and a chain engaged to said first sprocket and said second sprocket.

41. The apparatus of claim 31, wherein said means for rotating comprises a first gear having its central axis coaxial with said first axis, said first gear being incapable of rotating relative to said first axis;

an outer planetary gear having its central axis being coaxial with said second axis; and an intermediate planetary gear being engaged with said first gear and with said outer planetary gear.

42. A shower pipe assembly comprising:

a shower pipe;

means for oscillating the shower pipe along an axial path;

a base;

oscillating support means coupled between the base and the shower pipe and supporting the shower pipe from a point on the support means which is constrained by operation of the support means to oscillation along a straight line path;

said oscillating support means comprising:

a first arm rotatable about a first axis, said first axis being stationary relative to said base during rotation of said first arm;

a second arm rotatable about a second axis extending through said first arm wherein the distance between the first axis and second axis remains constant;

said second arm being of a length relative to the distance between the first and second axis to produce a straight line motion at a pivotal connector affixed to said second arm upon rotation of said second arm about said second axis a constant distance per degree of rotation of said first arm about said first axis; and means for rotating the second arm about said second axis a constant distance per degree of rotation of said first arm about said first axis to produce a straight line motion at said particular location on said second arm, wherein said means for rotating comprises a first pulley having its central axis being coaxial with said first axis and being incapable of rotating relative to said first axis, a second pulley having its central axis being coaxial with said second axis, and a belt engaged to the first pulley and the second pulley to prevent slippage between the belt and the first pulley, and to prevent slippage between the belt and the second pulley, said shower pipe being coupled to said second arm at said particular location of straight line motion of said second arm.

* * * * *